United States Patent [19]
Nitzsche et al.

[11] 3,914,476
[45] Oct. 21, 1975

[54] METHOD FOR IMPARTING WATER REPELLENCY TO INORGANIC SURFACES

[75] Inventors: Siegfried Nitzsche; Ewald Pirson; Michael Roth, all of Burghausen, Germany

[73] Assignee: Wacker-Chemie GmbH, Munich, Germany

[22] Filed: May 22, 1973

[21] Appl. No.: 362,714

[30] Foreign Application Priority Data
May 23, 1972 Germany............................ 2225013

[52] U.S. Cl.............. 427/337; 52/515; 106/287 SB; 428/447; 428/538; 428/540
[51] Int. Cl.².................... B28B 21/94; B05D 3/10
[58] Field of Search ........ 117/123 A, 123 B, 123 C, 117/123 D, 62.2, 62.1; 106/287 SB

[56] References Cited
UNITED STATES PATENTS

| | | | |
|---|---|---|---|
| 2,507,200 | 5/1950 | Elliott | 117/135.5 |
| 2,732,390 | 1/1956 | Clark | 117/123 D |
| 2,937,580 | 5/1960 | Spalding | 117/62.2 |
| 2,971,861 | 2/1961 | Reese | 117/123 C |
| 3,372,052 | 3/1968 | Polniaszek | 117/123 D |

FOREIGN PATENTS OR APPLICATIONS

| | | | |
|---|---|---|---|
| 1,003,116 | 2/1957 | Germany | |
| 655,614 | 1/1963 | Canada | 117/123 D |
| 736,561 | 9/1955 | United Kingdom | 117/123 D |

OTHER PUBLICATIONS

Noll, W., *Chemistry & Technology of Silicone*, Academic Press, 1968, New York, pp. 606–608.

*Primary Examiner*—William D. Martin
*Assistant Examiner*—William H. Schmidt

[57] ABSTRACT

The invention relates to a method for rendering inorganic surfaces water repellent by treating the surfaces with aqueous soluble carbonates, or bicarbonates simultaneously with, or subsequent to coating the surfaces with an aqueous solution of alkali metal organosiliconates.

The inorganic surfaces contain free lime. Surfaces to be treated include shaped building materials such as walls of concrete, clay bricks, natural stone, roofing tile, clay bricks, calcium silicate bricks, and asbestos cement. Wall coatings containing sand and hydraulic or nonhydraulic binding materials such as lime, cement and gypsum may also be treated.

6 Claims, No Drawings

METHOD FOR IMPARTING WATER REPELLENCY TO INORGANIC SURFACES

The present invention relates to the treatment of surfaces to impart water repellency thereto. More particularly it relates to a method for rendering inorganic surfaces water repellent by impregnating the surfaces with aqueous solutions of alkali metal organosiliconates while simultaneously, or subsequently treating the surfaces with aqueous soluble carbonates, or bicarbonates.

Although various techniques have been used to render inorganic substances water repellent, a distinction must be made between the addition of hydrophobic agents to the inorganic materials prior to molding and coating an inorganic surface with a hydrophobic agent after the object has been molded and cured. The present invention relates to a method for rendering a molded and cured article water repellent by the latter technique.

Heretofore, inorganic surfaces have been rendered water repellent by impregnating the surfaces with aqueous solutions of alkali metal organosiliconates such as is described in U.S. Pat. No. 2,507,200 to Elliott et al. It has however, been found that the so-called hydrophobic agents do not provide satisfactory results when the surfaces which are to be rendered water repellent contain free lime, or when the surfaces are not exposed to the atmosphere shortly after impregnation. In order to render surfaces containing free lime water repellent, it is essential to first pretreat the surfaces with salts such as a solution of ammonium bicarbonate. Merely coating at ambient temperature is generally not adequate and the pre-treated surfaces can be impregnated successfully with alkali metal organosiliconates only after drying (see DT-AS 1,003,116).

Therefore it is an object of this invention to treat inorganic surfaces to impart water repellency thereto. Another object of this invention is to provide a method for treating inorganic surfaces to render the same water repellent. Another object of this invention is to provide a method for imparting water repellency to surfaces containing free lime, i.e., objects which are prepared from inorganic materials containing lime, without having to pretreat the surface prior to the application of the alkali metal organosiliconates. A further object of this invention is to provide a method for rendering inorganic surfaces water repellent in a single drying step.

The foregoing objects and others which will become apparent from the following description are accomplished in accordance with this invention, generally speaking, by impregnating surfaces of objects made from inorganic materials with an aqueous solution of alkali metal organosiliconates, in which the aqueous solution contains from 100 to 500 percent by weight based on the weight of the alkali metal organosiliconate in the siliconate solution, of aqueous soluble carbonates and/or bicarbonates. The aqueous soluble carbonates and/or bicarbonates may be applied simultaneously with the siliconate solution, or subsequent to the application of the siliconate solution, but before the siliconate solution is completely dried.

Objects made from inorganic materials having surfaces to which the invention applies, consist particularly of shaped building materials having lime and/or silicon dioxide, or silicate base and building materials which are already located in the place of their intended use, such as walls, or facings as well as shaped building materials, such as clay bricks, prior to their use. Examples of shaped building materials containing lime and/or silicon dioxide, or silicates are: plaster, i.e. wall coatings having sand and hydraulic and/or non-hydraulic inorgainc binding materials such as lime, cement and/or gypsum, as well as walls and stuctures of concrete, clay bricks, natural stone, roofing tile, slag bricks, calciumsilicate bricks and asbestos cement.

The alkali metal contained in the alkali metal organosiliconates used in this invention, may be either lithium, sodium, potassium, rubidium, or cesium. Due to their availability, sodium and potassium are preferred; however, because of its lower tendency towards efflorescence, potassium is particularly preferred.

The alkali metal organosiliconates, especially monomer compounds may be represented by the general formula $$RSi(OH)_2 OM$$

and the polymer compounds are composed of units of the general formula $$RSiO(OM)$$

In these formulae R corresponds to a monovalent orgainc SI-C-bonded radical, preferably a monovalent aliphatic hydrocarbon radical having from 1 to 4 carbon atoms and/or an aromatic hydrocarbon radical, such as a phenyl radical and M is a alkali metal. Especially preferred as alkali metal organosiliconates are alkali metal methylsiliconates. Further examples of monovalent aliphatic hydrocarbon radicals represented by R are alkyl radicals, such as ethyl-, n-propyl-, isopropyl-, n-butyl- and sec.-butyl radicals as well as alkenyl radicals such as vinyl- and allyl radicals. Alkali metal organosiliconages are sometimes obtained from the distillation residue of the reaction product of hydrocarbon halides, especially methyl chloride, with silicon. This distillation residue contains silcarbanes. Thus a portion of the R radicals, or the siloxaneoxygen atoms can be replace by bivalent organic radicals, especially alkylene radicals such as methylene, ethylene, or propylene radicals which are bonded to an additional Si-atom. The R radicals of the Si-atoms can be identical, or different. It is preferred that no tertiary carbon atoms be present in the alpha-position to the Si-atom.

The alkali metal organosiliconates may be prepared from siliconic acids, monoorganosilane triols, or their condensation products and are described, for example, by Meads and Kipping, Journal of Chemical Society, 105,679. These siliconates may be prepared, for example, by hydrolyzing derivatives of a monohydrocarbon-substituted silane containing three hydrolyzable radicals such as halogen atoms, alkoxy groups and the like, connected to silicon, recovering the hydrolysis products and dissolving these products in a strong inorganic base, i.e., a solution of the bases of alkali metals, in such proportions that there is at least one equivalent of base per silicon atom. The resultant solution containing the soluble siliconate is dilute to the desired concentration.

The amount of alkali metal organosiliconate present in the aquenous solution is not critical and may range from about 1 to about 30 percent and more preferably from about 2 to 10 percent by weight based on the weight of the alkali metal organosiliconate and the solvent. Satisfactory results have been obtained when the alkali metal organosiliconate have been as low as 1 percent by weight.

In the aqueous solutions of alkali metal organosiliconates, up to 50 percent by weight of the water may be replaced with water miscible inert organic solvents, for example, alcohols, such as methanol, ethanol, n-propanol, isopropanol and/or ethylene glycol and/or ketones, such as acetone and/or methylethyl ketones. Although this may contribute to the solution stability, it is generally not required.

Any aqueous soluble salt such as carbonates, or bicarbonates may be used. preferred carbonates and/or bicarbonates are ammonium carbonate and/or ammonium bicarbonate because they do not create efflorescence. When light-colored surfaces are to be coated, alkali metal carbonates and/or alkali metal bicarbonates, such as sodium carbonate can also be used. Other alkali metal carbonates and acid carbonates which may be used are cesium carbonate, potassium carbonate, lithium carbonate, rubidium carbonate, potassium hydrogen carbonate and the like.

Preferably aqueous solutions containing from about 50 to about 350 percent by weight of aqueous soluble carbonates and/or bicarbonates based on the weight of the siliconate solutions content of alkali metal organosiliconate may be used.

In addition to the alkali metal organosiliconates, aqueous soluble carbonates, or bicarbonates, impurities such as sodium hydroxide, sodium chloride and solvents, if necessary, may be present. Also the solutions employed in this invention may contain substances which are generally additives for alkali metal organosiliconates solutions, such as alkali metal silicates, wetting agents, such as sodium tetradecylsulfate, pigments and thickening agents.

The solutions which are the subject of this invention may be applied by any means known in the art for coating surfaces to render the same water repellent, such as by painting, spraying, or immersion.

Where the application of the carbonate and/or bicarbonate solution on the surfaces which are to be rendered water repellent is carried out simultaneously with the application of the alkali metal organosiliconate solution, the two solutions may be combined, or they may be applied separately. In the event that a mixture of the two solutions is not stable over an extended period of time, such as would be the case when ammonium bicarbonate is used, then the mixture would be prepared about one hour prior to application. An effective means for applying a mixture containing an alkali metal organosiliconate and ammonium bicarbonate is through a mixing nozzle.

It is preferred that the alkali metal organosiliconate and carbonate and/or the bicarbonate solutions be applied together, since this method requires the least number of steps and because it produces the highest degree of water repellency. These solutions should contain from 10 to 350 percent by weight and more preferably from 30 to 150 percent by weight of carbonate and/or bicarbonate based on the weight of the alkali metal organosiliconate.

Where the alkali metal organosiliconate is first applied to the surfaces, then the carbonate and/or bicarbonate solution must be applied to the siliconate treated surfaces while they are wet from the non-evaporated water contained in the alkali metal organosiliconate solution and/or water that was used for the hydraulic, or non-hydraulic hardening of the inorganic substance.

Various embodiments of this invention are further illustrated by the following examples in which all parts are by weight unless otherwise specified. The percentages indicated in these examples are based on weight unless otherwise indicated.

EXAMPLE 1

Test samples of freshly cast gas concrete which still contain free lime and 29 percent by weight of water are immersed for 30 seconds each in an aqueous solution which contains about 4.37 percent potassium methylsiliconate and ammonium bicarbonate in the amount indicated in Table I. For purposes of comparison a similar sample of freshly cast gas concrete is immersed in a solution containing 4.37 percent potassium methylsiliconate. Subsequent to immersion the test samples are immediately packaged in polyethylene foil. After 5 days storage at ambient temperature, the test samples are removed from the foil, weighed and placed on water-soaked plastic foam. The degree of water absorption is then determined by renewed weighing of the test samples after 3, 5 and 8 hours, respectively, as indicated under "first measurement" in Table I. The just-described determination of water absorption is repeated after 8 days storage in a dry atmosphere and the results are listed in Table I under "second measurement".

TABLE I

| Ammonium bicarbonate content (%) of solution | Water absorption in kg/m² | | | | | |
|---|---|---|---|---|---|---|
| | First Measurement | | | Second Measurement | | |
| | 3 hrs. | 5 hrs. | 8 hrs. | 3 hrs. | 5 hrs. | 8 hrs. |
| 4 | 0 | 0 | 0 | 0.27 | 0.37 | 0.50 |
| 2 | 0.91 | 1.49 | 2.03 | 2.69 | 3.78 | 5.15 |
| 1 | 1.70 | 2.75 | 4.26 | 6.01 | 8.00 | 10.27 |
| 0 | 3.55 | 4.91 | 6.37 | 7.35 | 8.85 | 10.95 |
| untreated specimen | 5.94 | 7.35 | 8.92 | 8.22 | 10.20 | 12.58 |

EXAMPLE 2 a. Test samples of gas concrete of the type described in Example 1 are first immersed for 30 seconds in a 3.5 percent by weight aqueous solution of sodium methylsiliconate and immediately thereafter they are immersed for 30 seconds in a 10 percent by weight aqueous solution of ammonium bicarbonate. The two test samples are immediately placed one on top of the other and the contact opening is closed with putty [test samples (a)].

b. For purposes of comparison the procedure described under (a) is repeated except that they are not treated with ammonium bicarbonate solution [test samples (b)].

c. For further comparison purposes the procedure described under (a) is repeated except that they are not treated with ammonium bicarbonate solution and they are not placed one on top of the other [test samples (c)].

d. The procedure described under (a) is repeated except that in place of the previously mentioned double immersion treatment, the samples are immersed once in clean water for 30 seconds [test samples (d)].

All samples are stored in a dry atmosphere for 5 days. The test samples which were placed one upon the other (a, b and d) are then separated and all test samples are weighed and placed on plastic foam which has been soaked in water. All test sample sides which had previously been placed upon another test sample are now in contact with the plastic foam. The amount of water absorption is then determined by means of renewed weighing of the test samples for the time periods indicated in Table II.

TABLE II

| Samples | Water absorption in kg/m$^2$ | | | |
|---|---|---|---|---|
| | 3 hrs. | 5 hrs. | 8 hrs. | 24 hrs. |
| 2(a) | 0 | 0.04 | 0.06 | 0.40 |
| 2(b) | 4.14 | 5.29 | 6.33 | 10.20 |
| 2(c) | 0.23 | 0.30 | 0.37 | 0.60 |
| 2(d) | 6.80 | 8.22 | 9.30 | 13.88 |

EXAMPLE 3 a. The procedure described in Example 2(a) is repeated except that a 3 percent by weight solution of potassium methylsiliconate is substituted for the 3.5 percent by weight solution of sodium methylsiliconate [test samples 3(a)].

b. Test samples of gas concrete of the type described in Example 1 are immersed for 30 seconds in a solution prepared by mixing 400 parts of a 35 percent aqueous potassium methylsiliconate solution with 3,440 parts of water and 160 parts of ammonium carbonate. Immediately thereafter two samples for each test are placed one upon the other and the contact opening is sealed with putty [test samples 3(b)].

c. For purposes of comparison the procedure described in 3(a) is repeated, except that the test samples are immersed first in the ammonium bicarbonate solution and immediately thereafter in the siliconate solution [test samples 3(c)].

All test samples are stored for 5 days in a dry atmosphere. The test samples which had been placed one upon the other are separated, weighed and placed on the water soaked plastic foam. The side which was previously in contact with another test sample is now placed in contact with the plastic foam. The degree of water absorption is now determined by renewed weighing of the test samples at time periods indicated in Table III.

TABLE III

| Samples | Water absorption in kg/m$^2$ | |
|---|---|---|
| | 8 hours | 24 hours |
| 3(a) | 2.06 | 3.89 |
| 3(b) | 1.69 | 3.46 |
| 3(c) | 14.17 | 27.56 |

While specific embodiments of the invention have been described, it should not be limited to the particular alkali metal organosiliconates, or carbonates, or bicarbonates described herein. It is intended, therefore, to include all modifications within the spirit and scope of this invention.

What is claimed is:

1. An improved method for imparting water repellency to surfaces composed of inorganic substances and containing free lime by impregnating the surfaces with an aqueous solution of an alkali metal organosiliconate, the improvement which comprises applying simultaneously to said surfaces an aqueous solution of an alkali metal organosiliconate and from about 10 to 350 percent by weight based on the weight of the alkali metal organosiliconate in the siliconate solution of an aqueous soluble salt selected from the group consisting of alkali metal carbonates and bicarbonates and ammonium carbonate and bicarbonate.

2. The improved method of claim 1 wherein the amount of aqueous soluble salt is from about 50 to 350 percent by weight based on the weight of the alkali metal organosiliconate in the siliconate solution.

3. The improved method of claim 1 wherein the amount of aqueous soluble salt is from about 30 to 150 percent by weight based on the weight of the alkali metal organosiliconate in the siliconate solution.

4. The improved method of claim 1 wherein the aqueous soluble salt is ammonium carbonate.

5. The improved method of claim 1 wherein the water soluble salt is ammonium bicarbonate.

6. An improved method for imparting water repellency to surfaces composed of inorganic substances and containing free lime by impregnating the surfaces with an aqueous solution of an alkali metal organosiliconate, the improvement which comprises applying from 10 to 350 percent by weight based on the weight of the alkali metal organosiliconate in the siliconate solution of an aqueous soluble salt selected from the group consisting of alkali metal carbonates and bicarbonates and ammonium carbonate and bicarbonate to a surface treated with the alkali metal organosiliconate prior to the complete drying of the organosiliconate solution.

* * * * *